(12) United States Patent
Buchali et al.

(10) Patent No.: US 6,987,804 B2
(45) Date of Patent: Jan. 17, 2006

(54) PROCESS FOR RECOVERING DIGITAL OPTICAL SIGNALS AND A FEEDBACK DECISION CIRCUIT

(75) Inventors: Fred Buchali, Waiblingen (DE); Henning Bülow, Kornwestheim (DE)

(73) Assignee: Alcatel, Paris (FR)

( * ) Notice: Subject to any disclaimer, the term of this patent is extended or adjusted under 35 U.S.C. 154(b) by 820 days.

(21) Appl. No.: 09/816,381

(22) Filed: Mar. 26, 2001

(65) Prior Publication Data

US 2001/0040922 A1    Nov. 15, 2001

(30) Foreign Application Priority Data

Mar. 28, 2000 (DE) ................................ 100 15 115

(51) Int. Cl.
*H03H 7/30* (2006.01)

(52) U.S. Cl. ............... 375/233; 375/229; 398/147; 398/159; 398/208; 398/209

(58) Field of Classification Search ........... 375/233, 375/346, 375, 229, 259, 354, 355, 341, 260, 375/232, 240.2, 317; 398/209, 202, 214, 398/193, 147, 159, 208, 192, 29, 141, 90; 385/147

See application file for complete search history.

(56) References Cited

U.S. PATENT DOCUMENTS

| | | | |
|---|---|---|---|
| 5,031,194 A * | 7/1991 | Crespo et al. ............... 375/233 |
| 5,191,462 A * | 3/1993 | Gitlin et al. ................ 398/209 |
| 6,016,379 A * | 1/2000 | Bulow ........................ 385/147 |
| 6,285,709 B1 * | 9/2001 | Alelyunas et al. .......... 375/233 |
| 6,295,152 B1 * | 9/2001 | Wedding ..................... 398/209 |
| 6,307,884 B1 * | 10/2001 | Du et al. ..................... 375/233 |

FOREIGN PATENT DOCUMENTS

| | | |
|---|---|---|
| DE | 0 912 020 A2 | 10/1998 |
| DE | 198 06 682 A1 | 8/1999 |
| EP | 0 455 910 A2 | 11/1991 |

OTHER PUBLICATIONS

"Zero Forcing Decision-Feedback Equalizer for Packet Data Transmission", by Ghassan Kawas Kaleh, IEEE, 1993, pp. 1752-1756.

"Equalization of Bit Distortion Induced by Polarization Mode Dispersion" by Henning Bulow, NOC '97 pp. 65-72.

J. H. Winters et al, "Electrical Signal Processing Techniques in Long-Haul, Fiber-Optic Systems", International Conference on Communications. Atlanta, Apr. 15-19, 1990, New York, IEEEE, vol. 2, pp. 397-402, XP000146099.

S. Kasturia et al, "Techniques for high-speed implementation of nonlinear cancellation", IEEE Journal on Selected Areas in Communications, IEEE, Inc., NY, US, VO1. 9, Nr. 5, pp. 711-717, XP002179197.

* cited by examiner

*Primary Examiner*—Stephen Chin
*Assistant Examiner*—Ted M. Wang
(74) *Attorney, Agent, or Firm*—Sughrue Mion, PLLC

(57) ABSTRACT

A process is proposed for recovering disturbed digital signals, wherein the electrical signals pass through a feedback equalizer and an analogue control of the setting parameters of the equalizers is performed. A pseudo-error monitor, which facilitates a high-speed adjustment of decision element thresholds, is also provided.

8 Claims, 5 Drawing Sheets

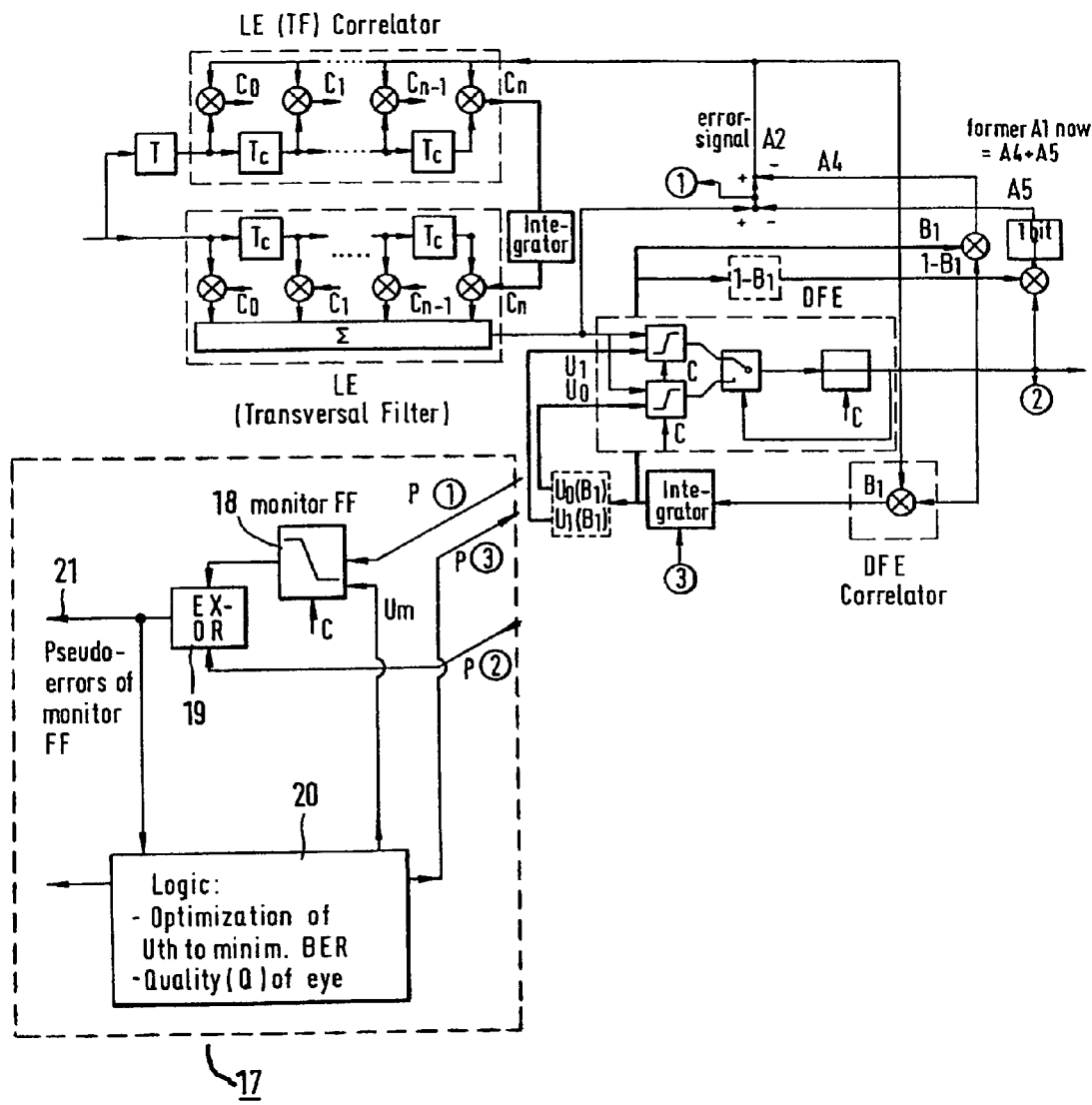

PROCESS FOR RECOVERING DIGITAL OPTICAL SIGNALS AND A FEEDBACK DECISION CIRCUIT

BACKGROUND OF THE INVENTION

This invention relates a process for recovering disturbed, digital, optical signals and a feedback decision circuit used in such a process.

The prior art has disclosed processes for recovering severely disturbed, digital, optical signals and feedback equalizers (DFE=Decision Feedback Equalizer). For example, the publication "Equalization of Bit Distortion Induced by Polarisation Mode Dispersion", H. Bülow, NOC 97, Antwerp 1997, p. 65 to 72 presents several possibilities of compensating dispersion using equalizers. FIG. 1 illustrates an equalizer known from the prior art. A disturbed transmitted optical signal is converted into a disturbed electrical signal 1 in an opto-electric converter. The disturbed signal is applied to a threshold decision element 2. From the output of the threshold decision element 2, the decided signal 11 is fed-back via a delay element 6. Via a multiplier the fed-back, time-delayed signal is multiplied by a parameter B1 and fed to an adder. In the prior art an analogue control process is used to obtain the parameter B1. A signal is tapped both at the input end before the threshold decision element and at the output end after the threshold decision element 2. The subtraction of these two signals yields an error signal 10 which, multiplied by the decided signal 11, yields the parameter B1. An analogue control process of this kind reacts very rapidly to changes in the optical signal. A control circuit of this kind adapts itself extremely rapidly to the circumstances of the transmission link and to disturbances caused by dispersion effects. It is advantageous to use the zero forcing algorithm, as described for example by G. KAWAS KALEH in "Zero-Forcing Decision-Feedback Equalizer for Packet Data Transmission", Proceedings of ICC, pp. 1762–6, Geneva, May 1993.

However, on the basis of currently available semiconductor circuits, the DFE known from FIG. 1 is not capable of processing data rates above 10 GBit/s. At these high data rates the propagation time differences of the signals in the feedback loop start to become significant. Therefore alternative decision circuits are used in the prior art.

For example, German OS DE 197 47 249 describes circuits which employ parallel threshold decision elements. The splitting of the overall data rate into parallel data streams reduces the time problem in the decision circuit. A circuit as illustrated in FIG. 2 is presented as an example. Here the input signal is distributed between a plurality of decision elements 2. The decision elements each have a threshold input U1 to Un, externally controlled by a digital processor 12. The outputs of the decision elements are connected to a multiplexer 4 connected to a logic unit 5. The logic unit 5 evaluates the outputs of individual flip-flops 7 of the delay logic stage 6 in order to connect the multiplexer. A decision circuit construction of this kind solves propagation time problems at high data rates. However, in this decision circuit no difference signal between disturbed input signal 1 and fed-back signal is available for generating the error signal 10.

SUMMARY OF THE INVENTION

Therefore the object of the invention is to propose a circuit with which it is possible to use decision circuits with parallel-connected threshold decision elements, and at the same time to combine the advantages of an analogue control of the setting parameters.

The process according to the invention for recovering severely disturbed, digital optical signals has the advantage that the speed of a parallel connection of threshold decision elements in a DFE is combined with the simple and rapid adaptation of controlled variables by an analogue control circuit. It is also advantageous to integrate a pseudo-error monitor which facilitates the assessment and adjustment of the decision element thresholds in the equalizer based on the quality of the signal. The feedback equalizer according to the invention also has the advantage that a synthetic, dispersive signal is generated, which facilitates an analogue control for determining the parameters. The integration of the pseudo-error monitor improves the equalizer, so that the decision thresholds can be adjusted based on the analysis of the pseudo-error and can be adapted to the prevailing circumstances of the transmission link.

BRIEF DESCRIPTION OF THE DRAWINGS

An exemplary embodiment of the invention is illustrated in FIG. 3 and explained in detail in the following description.

In the drawing:

FIG. 5 illustrates an equalizer with pseudo-error monitor.

DETAILED DESCRIPTION OF EMBODIMENTS

Figure 1:
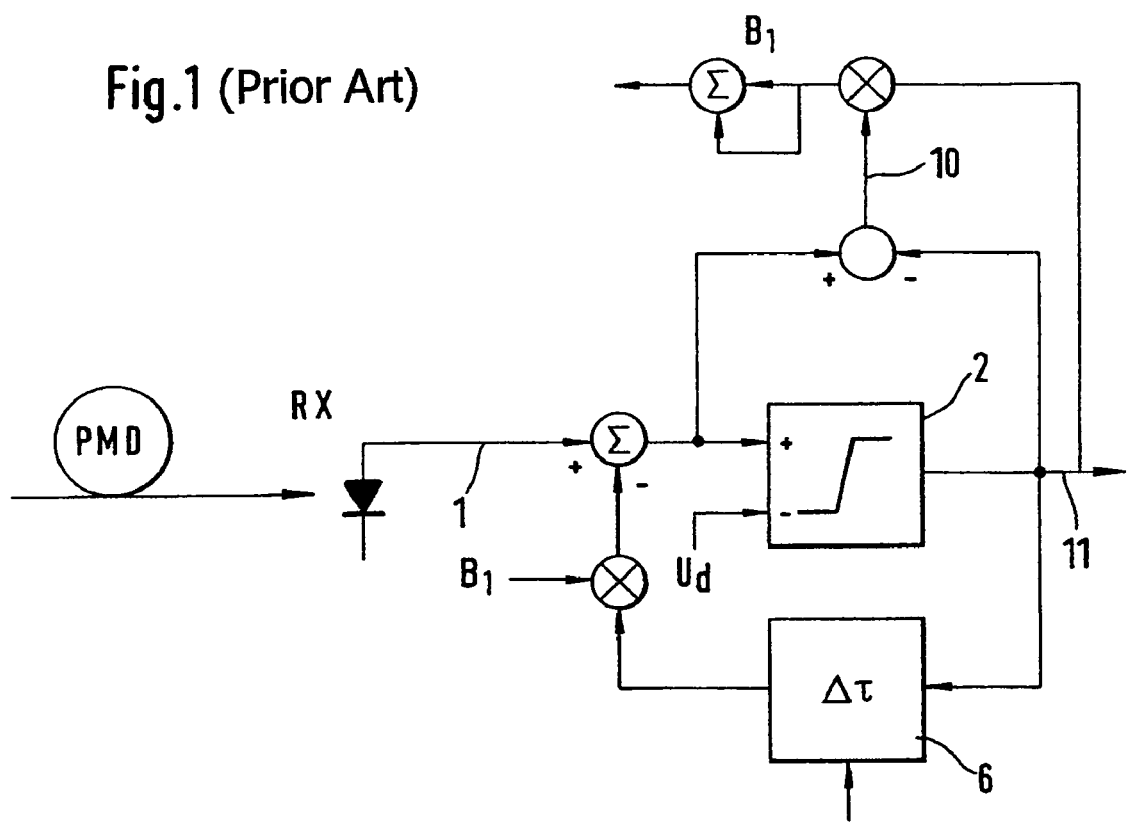
FIG. 1 illustrates an analogue feedback circuit according to the prior art.
Figure 2:
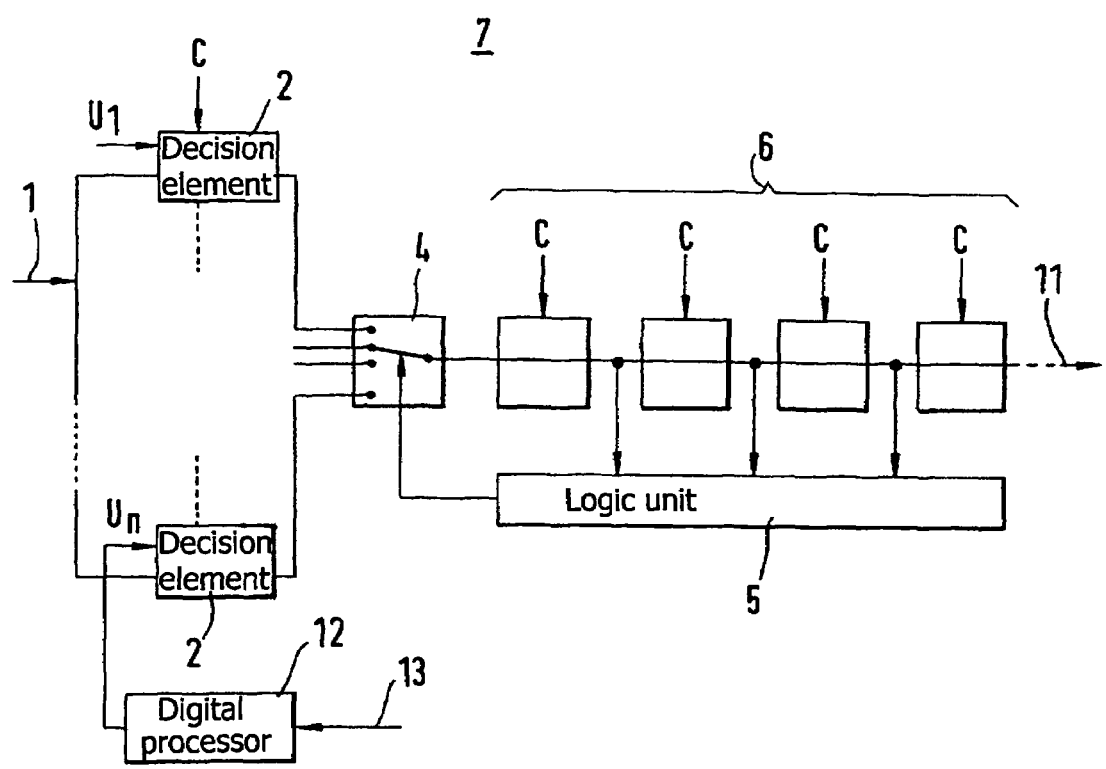
FIG. 2 illustrates a parallel decision circuit according to the prior art.
Figure 3:
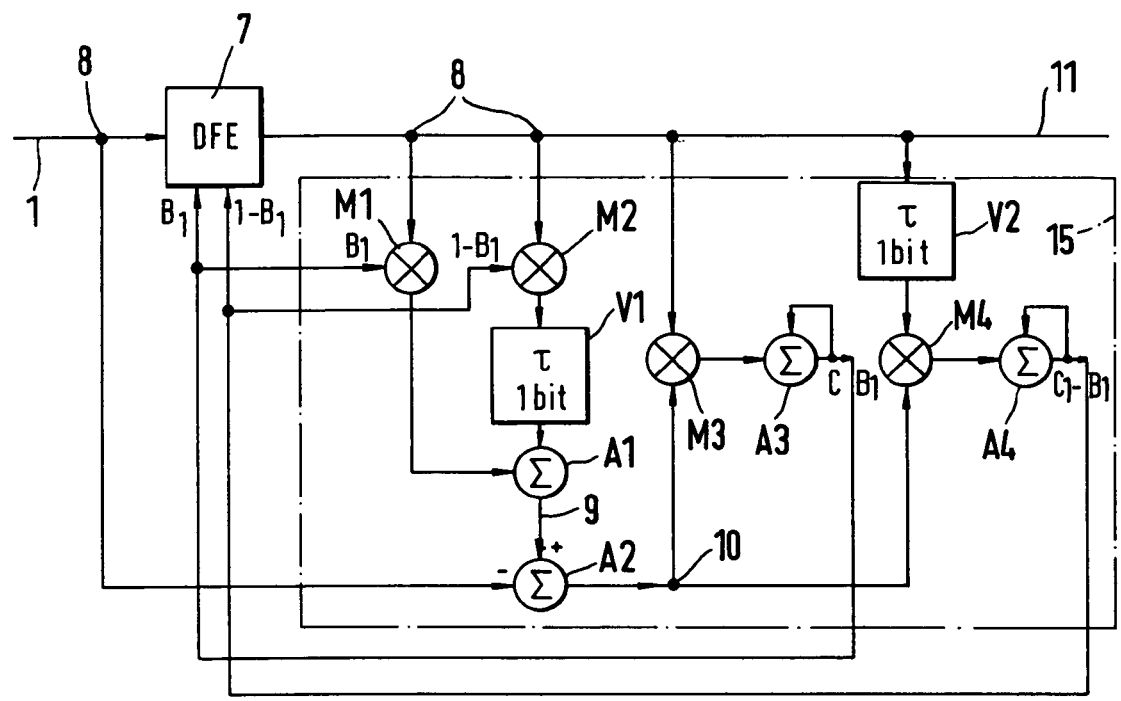
FIG. 3 illustrates an exemplary embodiment of the equalizer according to the invention.

FIG. 3 shows the main components of the equalizer according to the invention. A disturbed optical signal 1 is applied to a DFE 7. In this exemplary embodiment a DFE with two threshold decision elements, requiring two setting parameters, is used. The output of the DFE 7 supplies a signal 11 in respect of which a decision has been made. An analogue control stage 15 is shown in a broken-line frame. This analogue control stage 15 supplies setting parameters B1 and 1-B1 at its input end to the DFE. To perform the analogue control—as described in the prior art and with reference to FIG. 1—an adder A2, a multiplier M3, an adder A3 and a multiplier M4 and an adder A4 are used in the circuit according to the invention. A synthetic dispersive signal 9 and the disturbed optical signal 1 serve as input signal for the adder A2. The synthetic dispersive signal 9 is generated by tapping the decided signal 11, at nodes 8, and the fed-back setting parameters B1 and 1-B1. The first parameter B1 is multiplied in the multiplier M1 by the decided signal 11, and the second parameter 1-B1 is also multiplied by the decided signal 11 in a second multiplier M2. The multiplied signal of the multiplier M2 is delayed by 1 bit via a delay element V1. The results of the multiplier M1 and of the time-delayed signal of the multiplier M2 are added in an adder A1. This procedure yields a synthetic dispersive signal 9 which is based upon the decided signal and upon an estimation of the dispersion effects on the basis of the signal and echo amplitudes of the input signal. In the adder A2 the disturbed signal 1 is subtracted from the synthetic dispersive signal 9. The result is an error signal 10.

The output of the adder A2 is connected both to a multiplier M3 and to a multiplier M4. In the multiplier M3 the error signal is multiplied by the decided signal. The result of this multiplication is applied to an adder A3. The adder A3 determines the setting parameter B1 for the feedback into the DFE 7. The second setting parameter 1-B1 is generated by multiplying the error signal 10 by a decided signal 11 time-delayed by 1 bit. Here again the result of the multiplier M4 is fed through an adder A4 which determines the parameter 1-B1. An optimum is achieved with this circuit when the outputs of the adders A3 and A4 are each 0.

Figure 4:
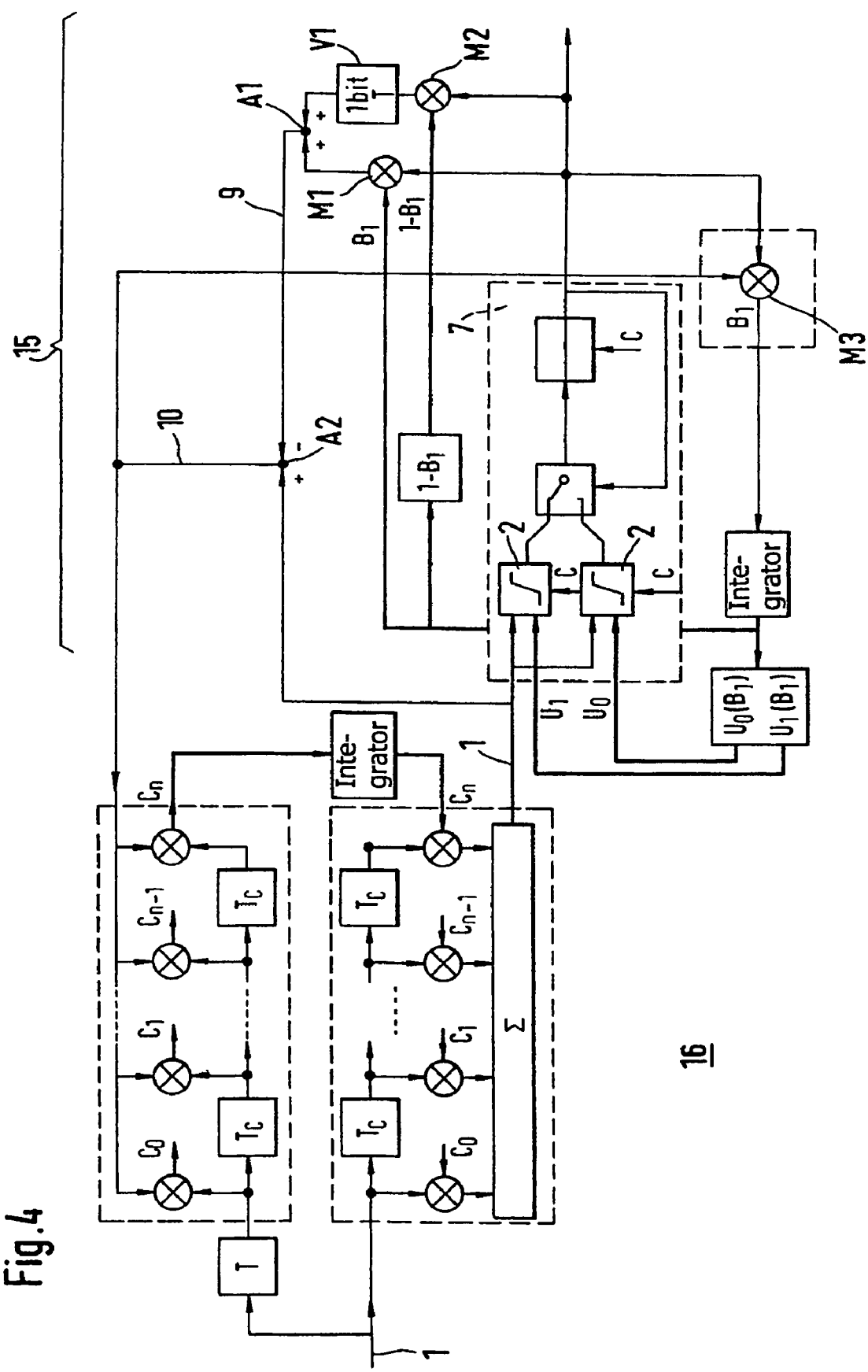
FIG. 4 illustrates a combination with a linear equalizer.

FIG. 4 illustrates the circuit according to FIG. 3 comprising the DFE 7 and the analogue control stage 15 but here depicted in a different way. The error signal 10, which arises as a result of the use of the disturbed signal 1 and the synthetic, dispersive signal 9, serves to actuate a linear equalizer 16.

A detailed description of a linear equalizer which can be used for example for this combination is given in German Application DE 19936254.8. This describes the principle of correlating the signal components with multipliers, delay elements and summation.

The circuit for the analogue control stage 15 shows only the derivation of the parameter B1, but not that of the parameter 1-B1. This parameter is derived as illustrated in FIG. 3.

In another embodiment the combination with a linear equalizer 16 has the advantage that the second parameter 1-B1 need not be determined as in FIG. 3. Ideally the use of a linear equalizer standardizes the signal amplitude to 1. In this way the second parameter 1-B1 can be simply determined by subtraction. The precise construction of the linear filter is not important, only the fact that the signal amplitude is standardized to 1, whereby the analogue control stage can be of a simpler design.

FIG. 5 illustrates a construction of an equalizer with "analogue" control, extended by a pseudo-error monitor. The signal P1, which is the disturbed optical signal following the linear equalizer, and the signal P2, which is the decided signal, serve as input signals for the monitor 17. In a monitor decision element 18, a decision is made on the disturbed signal with a variable threshold value $U_m$. The result is compared with the decided signal P2 in an EXOR circuit 19. This yields a pseudo-error signal 21. The pseudo-error signal 21 is analyzed in a logic circuit 20 and serves to adapt the decision element thresholds $U_{th}$ of the equalizer. The logic circuit 20 also determines the quality of the eye opening as a gauge of the quality of the signal recovery.

A pseudo-error monitor of this kind can also be used for other designs of equalizers.

What is claimed is:

1. A process for recovering disturbed digital optical signals, comprising:
   converting the disturbed digital optical signals to disturbed electrical signals;
   passing the disturbed electrical signals through a feedback decision circuit comprising at least two parallel-connected threshold decision elements to obtain decided signals;
   using the decided signals and an estimated dispersion to generate dispersive signals;
   generating an error signal with the disturbed signals and the dispersive signals, and
   deriving setting parameters for setting the threshold decision elements in accordance with at least said error signal.

2. The process according to claim 1, wherein an analogue control stage generates the error signal in accordance with an analogue procedure.

3. The process according to claim 2, wherein the analogue control stage operates using a zero-forcing algorithm.

4. The process according to claim 1, wherein a pseudo-error monitor compares the disturbed digital optical signals with the decided signals and determines a pseudo-error therefrom.

5. A feedback decision circuit comprising:
   an input for optically transmitted data reconverted into electronic signals, at least two parallel-connected threshold decision elements, and an analogue control stage for determining setting parameters for the threshold decision elements,
   wherein tappings are provided for deriving a disturbed signal from the input and a decided signal from the threshold decision elements, and the analogue control stage contains a circuit for determining a synthetic dispersive signal from the decided signal and an estimated, and that the synthetic dispersive signal and the disturbed signal are fed to a circuit for determining an error signal and to a circuit for determining at least two of said setting parameters.

6. The feedback decision circuit according to claim 5, wherein the feedback decision circuit is connected to a linear equalizer.

7. The feedback decision circuit according to claim 6, wherein the linear equalizer standardizes a signal amplitude to 1 and the analogue control stage is reduced to the derivation of a parameter B1.

8. A feedback decision circuit according to claim 5, comprising a pseudo-error monitor comprising a monitor decision element, an EXOR-circuit and a logic circuit.

* * * * *